United States Patent
Sinclair

(10) Patent No.: US 12,265,571 B2
(45) Date of Patent: Apr. 1, 2025

(54) TEXT CLASSIFICATION METHOD

(71) Applicant: OZECOM PTY LTD, Manly (AU)

(72) Inventor: Lee Sinclair, Ashgrove (AU)

(73) Assignee: OZECOM PTY LTD, Manly (AU)

( * ) Notice: Subject to any disclaimer, the term of this patent is extended or adjusted under 35 U.S.C. 154(b) by 0 days.

(21) Appl. No.: 17/639,899

(22) PCT Filed: Aug. 31, 2020

(86) PCT No.: PCT/AU2020/050914
§ 371 (c)(1),
(2) Date: Mar. 2, 2022

(87) PCT Pub. No.: WO2021/042160
PCT Pub. Date: Mar. 11, 2021

(65) Prior Publication Data
US 2022/0342922 A1   Oct. 27, 2022

(30) Foreign Application Priority Data

Sep. 2, 2019   (AU) ................................ 2019903229

(51) Int. Cl.
*G06F 16/00*   (2019.01)
*G06F 16/353*   (2025.01)

(52) U.S. Cl.
CPC .................... *G06F 16/353* (2019.01)

(58) Field of Classification Search
CPC ...... G06F 16/353; G06F 40/30; G06F 40/295; G06F 16/35; G06N 5/025; G06N 20/00
See application file for complete search history.

(56) References Cited

U.S. PATENT DOCUMENTS

| 10,453,079 | B2 * | 10/2019 | Bodden | G06Q 30/0201 |
| 10,659,403 | B2 * | 5/2020 | Smullen | H04L 67/61 |
| 10,831,990 | B1 * | 11/2020 | Tater | G06F 40/226 |
| 10,931,611 | B2 * | 2/2021 | Dotan-Cohen | H04L 51/224 |
| 11,017,180 | B2 * | 5/2021 | Gandhi | G06F 40/284 |
| 11,140,115 | B1 * | 10/2021 | Lukacs | H04L 51/18 |
| 11,566,659 | B2 * | 1/2023 | Moffatt | A63H 3/46 |

(Continued)

FOREIGN PATENT DOCUMENTS

WO   WO 2018/182501 A1   10/2018

OTHER PUBLICATIONS

Kamruzzaman, S. et al., 'A hybrid learning algorithm for text classification' Proc. 3rd International Conference on Electrical & Computer Engineering ICECE 2004, Bangladesh, 2004, pp. 577-580.

(Continued)

*Primary Examiner* — Debbie M Le
(74) *Attorney, Agent, or Firm* — Knobbe, Martens, Olson and Bear, LLP

(57) ABSTRACT

Disclosed is a system and method for classifying a message comprising a text to determine whether to assign one or more classification categories to the message. The method comprises evaluating the received message using two or more general evaluators; analysing the received message to determine values of one or more properties of the received message; and determining a classification output on the basis of outputs of the general evaluators, dependent on the values of the one or more properties of the received message.

19 Claims, 6 Drawing Sheets

(56) References Cited

U.S. PATENT DOCUMENTS

| | | | |
|---|---|---|---|
| 11,948,048 B2* | 4/2024 | Adjaoute | ................. G06N 7/01 |
| 12,058,092 B1* | 8/2024 | Lukacs | ................. G06N 20/00 |
| 2016/0321243 A1 | 11/2016 | Walia et al. | |
| 2017/0308523 A1 | 10/2017 | Wang et al. | |
| 2021/0224306 A1* | 7/2021 | Choudhary | .............. G06N 5/04 |
| 2022/0070234 A1* | 3/2022 | Deole | ................ H04L 65/1069 |

OTHER PUBLICATIONS

Villena-Román, J. et al., 'Hybrid Approach Combining Machine Learning and a Rule-Based Expert System for Text Categorization', Proceedings of the 24th FLAIRS Conference, 2011, pp. 323-328.

* cited by examiner

TEXT CLASSIFICATION METHOD

CROSS-REFERENCE TO RELATED APPLICATIONS

The present application is the U.S. national stage under 35 U.S.C. § 371 of International Application No. PCT/AU2020/050914, filed Aug. 31, 2020, which claims priority to AU Patent Application No. 2019903229, filed Sep. 2, 2019.

TECHNICAL FIELD

This disclosure relates to a method and system for text classification.

BACKGROUND ART

In day to day communication, a human reader can often ascertain the social or semantic meaning or context in the spoken or written language. This is done intuitively. The neural process of how the interpretation is made is as yet unclear. Text classification is a process whereby one or more classes are assigned to a text. It is useful in the discretisation or quantification of the determination of a social or a semantic context in the text analysed, so that this process can be performed by a computer.

The primary elements which are needed in order to algorithmically classify text include: the classification algorithm, the classification model, and the text to classify. Thus the accuracy of the classification will be subject to the limitation of the algorithm and of the model. There are algorithms available which can reasonably ascertain the context of texts which are at least one or two paragraphs in length. However, they tend not to work well for texts of short lengths. For example, the statement "they are sleeping with the fishes" could be classified as an activity, "sleeping". However, the darker meaning associated with the sentence would be lost by this classification, when this phrase would likely be instantly known by a person as a cultural reference to its darker meanings.

With the advent of communication and messaging technologies widely available today, many communications—e.g., instant messages—are in the form of short texts. The short lengths of the texts place a potential limitation on the ability of existing text classification algorithms to correctly ascertain the context of the messages. However, the ability to do so is important, for the computer algorithm to be able to identify when, e.g., a poster or sender of the text might be conveying distress, or thoughts of fear or self-harm, etc.

It is to be understood that, if any prior art is referred to herein, such reference does not constitute an admission that the prior art forms a part of the common general knowledge in the art, in Australia or any other country.

SUMMARY

In a first aspect, the present invention provides a method of classifying a message comprising a text to determine whether to assign one or more classification categories to the message. The method comprises: evaluating the received message using two or more general evaluators; analysing the received message to determine values of one or more properties of the received message; and determining a classification output on the basis of outputs of the general evaluators, dependent on the values of the one or more properties of the received message.

The method can include evaluating the message using at least one authority evaluator, the at least one authority evaluator being adapted to match the text against a criterion or multiple criteria, specific to one of the one or more classification categories.

A positive determination of assignment by the at least one authority evaluator to the corresponding classification category can override a negative determination by any one of the two or more general evaluators in relation to the same classification category.

A negative determination of assignment by the at least one authority evaluator to the corresponding classification category overrides a positive determination by any one of the general evaluators in relation to the same classification category.

The method can include the step of optimising the outputs of the general evaluators, by selecting one of the outputs of the general evaluators or by combining the outputs of two of more of the general evaluators.

The method can include applying a weighting to the outputs of the general evaluators, and combining the weighted outputs of the general evaluators.

The properties of the message can include statistical properties of the text, the language in which the text is written, one or more non-content related properties, or one or more entities identified in the text, or a combination thereof.

The statistical properties can include any of the following: the number of characters in the text, the number of words included in the text, the percentage of unique words in the text, a minimum word length, a maximum word length, an average word length, an average number of words per sentence, the percentage of the received text which are nouns, the percentage of the received text which are verbs, the percentage of the received text which are adjectives, the percentage of the received text which are adverbs.

The method can include, for each classification category, determining a best suited general evaluator on the basis of the values of the properties.

The method can include, for each category, identifying from a set of past messages, at least one past message having similar values for the properties as the text, and identify a best performing general evaluator in relation to the at least one identified one past messages, wherein the best suited general evaluator is the identified best performing general evaluator.

The method can include converting the values of the properties of the message into a message vector.

The non-numerical values of the properties of the message can converted into numbers, so that the message vector is a numerical vector. For instance, the algorithms will identify the "location" entities in the text, and provide a count of the location entities identified, as the value for the "location entity" property.

Scaling factors can be applied to numbers in the numerical vector.

A distance between message vectors can be used to determine how similar messages from which the message vectors are obtained are to each other.

Identifying the at least one past message can include dentifying a predetermined number of closest past messages to the message vector corresponding to the received message.

Identifying the at least one past message includes identifying past messages that are within a predetermined distance from the message vector corresponding to the received message.

The method can include dividing the past messages into two or more different groups on the basis of their corresponding message vectors, and identifying the group to which the message vector corresponding to the received message belongs.

Past messages processed by the classification engine can be stored as a training data set.

A size of the training data set can be kept within an optimised size limit.

Once the training data set reaches the optimised size limit, an oldest data in the training data set is replaced the data associated with a newly received message.

The method can include enabling a user to provide feedback regarding an accuracy or indicating a success or failure of the classification output.

The user providing feedback can be a sender of the message, or a responsible party associated with the user.

A feedback indicating an inaccuracy or failure of the classification output, and the general evaluator involved in providing the classification output, can be stored against the message vector.

In a second aspect, the present invention includes a system for classifying a message comprising a text, to determine whether to assign one or more classification categories to the message, comprising one or more program modules, comprising algorithms to implement the method mentioned above in respect of the first aspect.

In the system, the algorithms can comprises one or more optimisation algorithms for optimising the outputs of the general evaluators on the basis of more properties, wherein the one or more optimisation algorithms are self-training.

The program modules of the system can reside on one processing unit, or across two or more processing units.

In a third aspect, the present invention provides machine-readable medium including thereon computer code executable to implement the method mentioned above in respect of the first aspect.

In a fourth aspect, the present invention provides an application interface adapted to enable user feedback in the method mentioned above in respect of the first aspect.

In a fifth aspect, the present invention provides machine executable code, which when run on a processing device, is adapted to provide the application interface mentioned above in respect of the fourth aspect.

In a sixth aspect, the present invention provides a messaging or communication platform, including a server on which there is provided the classification system mentioned above in respect of the second aspect, and the application interface mentioned above in respect of the fourth aspect.

The platform can further include an application interface for user entry of a message and for delivery of the message to the server.

The delivery of the message, delivery of a feedback request, and delivery of feedback, can be enabled over the internet or over a private communication network.

The application interface for user entry, or the application interface adapted to enable user feedback, or both, can be part of a communication or messaging application.

BRIEF DESCRIPTION OF THE DRAWINGS

Embodiments will now be described by way of example only, with reference to the accompanying drawings in which FIG. 1 schematically depicts a text classification process in accordance with an embodiment of the present invention.

DETAILED DESCRIPTION

Figure 1:
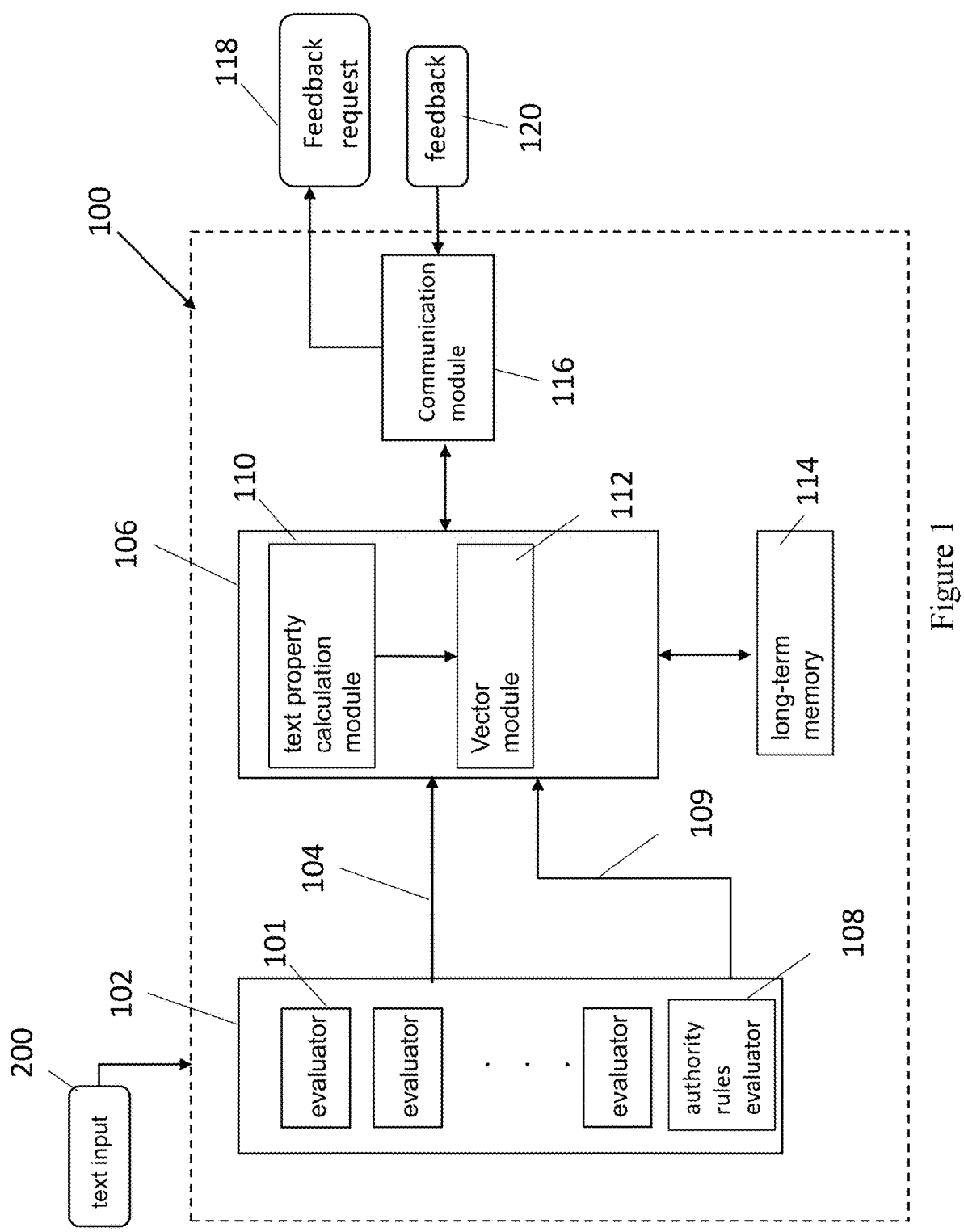

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

The present disclosure provides a method and system for text classification. The system uses a multivariate algorithm selection approach, which includes the implementation of different types of text classification algorithms, each being adapted to suit a particular "class" to which the text is to be assigned. The results or outputs from the different text classification algorithms will be given weightings and combined, to determine the classification of the text.

FIG. 1 schematically depicts a text classification engine 100 in accordance with an embodiment of the present invention. The classification engine 100 comprises an evaluator module 102, which includes plurality of evaluators 101 adapted to evaluate a text input (e.g. message) 200 received by the system 100. The evaluators 101 are general evaluators as they are applicable for evaluating the text for different categories. Different evaluators 101 may be used, but will preferably be those known to historically have had more success with shorter sentences, in embodiments which are intended to interpret text that are short in duration. Examples of the general evaluators 101 which may be selected include, but are not limited to: a Bayes evaluator, a vector evaluator, a deep learning evaluator.

The evaluators 101 are each adapted to evaluate the received text 200 to determine an output 104. The output 104 can be a likelihood (probability), a score or a value, associated with each category or "class" that can potentially be assigned to the received text 200. Each output 104 will thus represent the probability that an assignment of a particular category should be assigned to the received text 200 (or that the received text 200 contains or indicates a particular context of that category), or vice versa. Depending on the specific embodiment, there might be a threshold, where a positive assignment of a category should only be made, if the evaluator output 104 is greater than or equal to the threshold. The same threshold may be applied to all of the outputs, or only some of the outputs. Or, there may be different thresholds for different general evaluators 101. There may further be different thresholds for outputs by the same evaluator 101 but in relation to different categories. In the case where the outputs 104 are each a likelihood, the threshold may be between 65 to 75%, or between 65 to 70%, or be another value. The threshold may be determined by reviewing the historical data associated with the evaluator 101, to find the tipping point, i.e., the minimum "likelihood" required for a positive assignment to be made, at which the accuracy of the evaluator markedly increases.

In the depicted example, the categories can include those which are associated with emotions, such as, but not limited to: "offensive", "distress", "insults", "toxicity", "sadness", "joy", "surprise", "fear", "anger". The categories can further include those which are not necessarily associated with an emotion, but should or need to be identified, such as but not limited to, nudity, sexting, danger, threats, time or date.

In some embodiments, all of the general evaluators 101 are executed, for each category. Thus, for a given received text 200, for each category which is included in the engine 100, a category score will be determined by each general evaluator. The number of general outputs 104 will thus be the product of the number of general evaluators 101 and the number of categories. The storage of all of the outputs of all of the evaluators is not essential in all cases, and will be done on the basis of business needs, or any algorithm requirements in particular embodiments.

The classification engine 100 further includes an optimisation module 106 which is adapted to select or combine the results of the general evaluators 101, in order to identify the category or categories, if any, to which the text is to be assigned. The optimisation modules 106 does so by calculating a number of properties in relation to the text 200 (see FIG. 2). On the basis of those properties, the optimisation module 106 determines how to select or combine the outputs 104 from the general evaluators 101.

In some embodiments, on the basis of the text properties, for a particular category, the optimisation module 106 will determine which general evaluator 101 will be best for determining whether that category applies to the text, and thus choose the output of the best evaluator 101. The chosen output 104 will then be used to determine whether an assignment should be made, e.g., where an assignment is made if the chosen output 104 is greater than a threshold.

In a particular implementation, from the text properties of a received text 100, for each category being considered, the optimisation module 106 may determine the probability that an evaluator 101 will successfully identify when the assignment should be made. This is done for every general evaluator 101. On this basis, for each category, the evaluator 101 which has the best probability of success (i.e. best chance that its result will be accurate) will be chosen. It may be that none of the outputs will be chosen because none of the evaluators 101 are determined to have a high enough chance of accurately evaluating the text for a particular category. In this case, an assignment of that category will also not be made.

In some embodiments, for a particular category, the evaluator optimisation module 106 will combine results from two or more of the evaluators 101. For instance this may be done by applying different weightings to their outputs. In some embodiments, a combination of approaches may be taken so that a selection is made for some of the categories, and a combination is made or the other categories.

The skilled person will be able to devise algorithms to implement this selection or combination. For instance, for each one of the categories, weighting coefficients or multipliers will be applied to the outputs of the plurality of evaluators 101. To make a "selection" of the result of the best suited evaluator, the weighting applied to the other evaluator can be zero.

In alternative embodiments, the optimisation module 106 will determine which one or ones of the evaluators 101 should be run to evaluate the text against a given category. For example, the evaluator optimisation module 106 will select a best evaluator 102 for the category, and only that evaluator 101 is run to provide a result for the category.

Preferably, the classification engine 100 further includes one or more authority rules evaluators 108 which will also process the text 200. The authority rules evaluator 108 can be included in the evaluator module 102 with the other evaluators 101. Each authority rules evaluator 108 comprises one or more algorithms which will determine whether the text matches one or more authority rules as defined by the algorithms. The authority rules are usually expert-driven search rules—e.g., those that capture particular research findings, or those that capture known alarming phrases. This is especially useful in cases of short sentences which lack specific identifiers or unique words. If there is a match between the received text 200 and the rules, then the category, categories, or domain to which the authority rules are specific will be assigned to the text. Therefore, the output 109 from an authority rules evaluator 108 may be binary—i.e., either there is a match between the text and the authority rules (positive output) or there is not a match between the text and the authority rules (negative output).

If there are authority rules defined for a particular category which is also processed by the general evaluators 101, then the result from the authority rules evaluator 108 may take precedence over or override the result for that category from the other evaluators 101.

In some cases, for all categories, the authority rules evaluators 108 are run as well as the general evaluators 101. For categories in respect of which authority rules evaluators 108 are provided, the classification engine 100 outputs the result 109 from the authority rules evaluator 108 if the authority result 109 is positive, indicating that there is a match between the text 200 and the authority rules, and thus the category should be assigned to the received text. That is, the positive result from the authority rules evaluator 108 will take precedence.

In some cases, for any category, if there are no results from any authority rules evaluator 108, or if the result 109 from an authority rules evaluator 108 is negative, then the classification engine 100 will determine whether the category should be assigned, based on the optimised result from the general evaluators 101.

In some cases, the evaluators 101 only evaluate the received text 200 against categories for which there are no corresponding rules defined by the authority rules evaluator 108.

In some cases, the evaluators 101 evaluate the received text 200 against categories for which there are no corresponding rules defined by the authority rules evaluator 108, and also categories in respect of which the authority rules evaluator 108 has made a negative determination (of no assignment of the text to that category, or vice versa).

The results 104, 109 from the evaluators 101, 108 are stored for analysis. In some embodiments, the data stored will include the results, data in relation to the properties of the text analysed, and if available, feedback data indicating the accuracy of the optimised result. The stored results can be all of the results generated by all of the evaluators in one extreme, or simply the optimised result (classification system output) provided and the evaluator used to generate the output.

The accuracy can be determined via a feedback mechanism— e.g., feedback data received from the user, or from responsible parties such a parent or a teacher, or parties overseeing or receiving notification regarding that user's activities. The data stored thus becomes part of the training data. The data may be stored in a long-term memory location 114 to which the optimisation module 106 has access. The long-term memory location 114 may be provided on the same server(s) as the classification engine. Depending on the architecture of the classification engine 100, as can be determined by the skilled person having regard to the disclosure provided herein, the memory location 114 may in some cases be part of the classification engine 100.

In some embodiments, the training data set will keep expanding, until a particular data size is reached. Thereafter as new data are stored, the oldest data will be discarded, to keep the training data set at a particular size. This process allows the training data set to be updated.

Preferably, this particular size is the optimal data size. The skilled person will be able to ascertain the optimal data size. For example, the optimal size is determined by using a percentage of the training set for testing and measuring accuracy. During this refinement process, the system will determine a dataset size with the highest possible accuracy rate.

Thus, the evaluator optimisation module 106, for each category, will have access to data which indicate the success (i.e., accuracy) that a particular evaluator has had so far, for messages of certain properties or characteristics.

Figure 2:
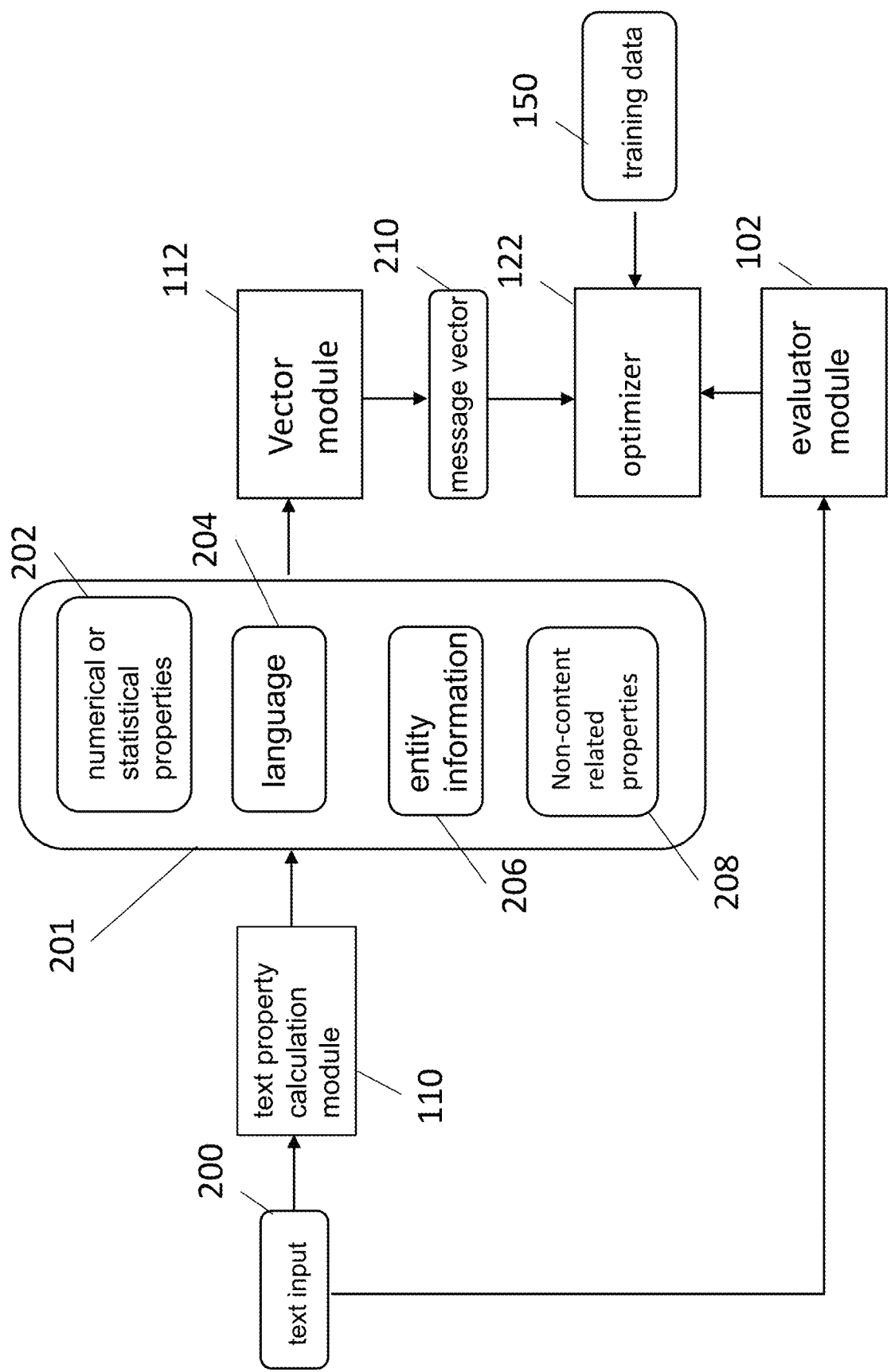
FIG. 2 schematically depicts an optimisation module provided in accordance with an embodiment of the present invention.

More specific concerning the optimisation module 106 is now discussed below with reference to FIG. 2. The optimisation module 106 loosely refers to the algorithms or functions which process the received text 200, in order to determine the optimal output from the general evaluators.

The optimisation module 106 includes a plurality of algorithms for determining various properties 201 associated with the text 200 being processed. The aforementioned plurality of algorithms may be considered as being provided in a text property calculation module 110.

The properties 201 which are calculated may include one or more numerical or statistical properties 202 of the received text 200. These can include, but are not limited to, some or all of: the number of characters, the number of words, the percentage of unique words (i.e. words which are not duplicated in the text), minimum word length (i.e., the number of characters in the shortest word included in the text), maximum word length (i.e., the number of characters in the longest word included in the text), an average word length, the average number of words per sentence. The numerical properties can also include properties relating to the make-up of the text—e.g., the percentage of the received text which are nouns, the percentage of the received text which are verbs, the percentage of the received text which are adjectives, the percentage of the received text which are adverbs. In some embodiments, an algorithm may also be included to identify the language 204 used in the text. The properties 201 determined by the module 106 can further include entity information 206 mentioned in the text, such as locations, persons identified by name, persons identified by relationship, organisations, money/currency, percentages, dates, times) mentioned in the text 200. Non-content related properties 208—i.e., properties which are not related to the content of the text, such as the location, date or time, that the text or the message is sent—may also be determined, i.e., by looking up the calendar or by querying a timestamp register, or a locator module such as GPS (if available). For instance, a value may be assigned to the received date if it is a known date—e.g., significant religious holiday (Christmas, a day during Ramadan, Chanukah, New Years Day, Valentines Day), or a specific date associated with the account of the person who composed the message (e.g., birthday). The properties can also be handles (e.g., a user handle) or a hashtag or tag, which are specific to particular platforms or social media (e.g., Instagram®, Twitter®, Facebook®, etc).

The values relating to entity properties can be the count of various kinds of entities are included in the message, e.g., three place names, five persons mentioned, one holiday mentioned, two different kinds of languages used in the message. In the aforementioned example, the values of "entity properties", e.g., the name entity, person entity, date entity, and language entity, would then be three, five, one, and two, respectively.

The entities can be determined using named-entity recognition algorithms such as the stanfordNER library; while verbs, adverbs etc can be determined using a Parts of Speech (POS) library for example the Stanford Log-linear Part-Of-Speech Tagger. Language can be explicitly provided by the platform that provides the text (for example Twitter) or by using an N-Gram library. N-Grams use the frequency distribution of letters in the text to best match known distributions of languages.

In some cases, the above properties are converted into a message vector 210. This may be done by one or a plurality of algorithms loosely considered to constitute a vector module 112. The properties 201 may be encoded as metadata attached to the text 200, and the data entry is provided to the vector module 112 as input, for processing or conversion into the message vector 210.

In one embodiment, conversion of the properties 201 into a message vector 210 comprises defining a matrix of numbers, each number being determined from the values of the properties.

Preferably, the numbers are further weighted or scaled, so that numbers associated with the different properties are scaled according to the impact or influence they each potentially exerts on the accuracy of the evaluators 101. For instance, the number of characters in a message may be a larger number than the number of words in a message. However this does not indicate that the number of characters will be of a higher potential importance compared with the number of words. The scaling fits the raw number associated with the text property to a scaled number, being a numerical measure of the potential importance of the text property.

The vectors 210 generated from different messages 200 are unlikely to be identical. Thus, the classification engine 100 will reference those existing message vectors 210 in the training data set 150, which are similar to the incoming message vector, to determine how to choose the best evaluator 101, or how best to combine results from the evaluators 101.

The optimisation module 106 includes one or more algorithms 122 which are adapted to optimise (e.g., by selecting, combining, or both) the results from the evaluator module 102, by determining or identifying vectors which are closest to the incoming message vector. This is a quantitative way of determining which of the past messages are of the most similar properties to the newly processed message. The measurement of how "close" or how "far" two vectors are in relation to each other can be calculated using different methods as can be determined by the skilled person. For instance, the "distance" between two vectors may be calculated as the square root of the sum of the squares of each of the difference in the numerical values at each vector position. The vector positions will each correspond with one property whose value is used to build the vector.

In one scenario, the algorithm(s) 122 may identify any past message vectors which are within a predetermined "distance" from the newly processed message vector, and determine the evaluator(s) 101 which have had the most success in the various categories considered by the classification engine 100. The predetermined distance can be arbitrary chosen, or it can be chosen during the testing process where a distance which yields the best results is chosen.

In another scenario, the algorithm(s) 122 may instead identify a predetermined number of messages which are the closest in distance to the newly processed message vector. The predetermined number can be chosen by an optimisation algorithm as can be determined by the skilled person. Or, again, it can be chosen during the testing process to see what number of closest vectors yields the best accuracy, when the classification engine 100 is tested using the test data.

In another scenario, the above two approaches are combined. For instance, the algorithm(s) 122 will identify a predetermined number of closest messages from the message processed message, but of those messages will only consider ones that are within a particular "distance" from the newly processed message.

In another scenario, the algorithm(s) 122 will be run regularly, at intervals, randomly, or at times chosen by an administrator, to determine or identify groups of historical vectors in the training data which are closest to each other (i.e., which of the past messages are of the most similar properties to each other). When a new message 200 is processed, and its corresponding vector 210 calculated, the classification engine 100 can then determine its group membership, i.e., to which "group" of past (historical) vectors the new message vector belongs.

For each category, the evaluator 101 which has had the best (i.e. most accurate) result for the messages amongst the identified messages will be chosen as the best-suited evaluator for the category. The output of the best-suited evaluator 101 will then be the optimised output by the evaluator optimisation module 106.

In one example, the identification of the "best" evaluator is achieved by determining, for each evaluator, the percentage of positive outputs (i.e. assignment of the category) that are confirmed to be correct, or the "true positives". Thus, the likelihood of success here is the percentage of true positives, and the evaluator which as had the highest percentage of true positives (or the lowest percentage of false positives) will be chosen as the "best" or most suitable evaluator. This is done for each category.

In further examples, the likelihood of success may further take into account the percentage of true or false negatives.

In the case that the classification engine 100 determines to which pre-identified "group" the newly processed message should be assigned, the "best-suited" evaluator(s) for each category may be looked up from a table. The values of the table will be updated as the classification engine 100 is retrained each time.

In the above cases, following the identification of the relevant training data and the past best performing ("best-suited") evaluator(s), the output of the best-suited evaluator 101 will then be the optimised output by the evaluator optimisation module 106. As alluded to earlier, the selection of the output of the "best" evaluator (or combination of the outputs of two or more "best" evaluators) may be predicated on the "best" likelihood of success being equal to or greater than, or simply greater than, a threshold value.

Figure 3:
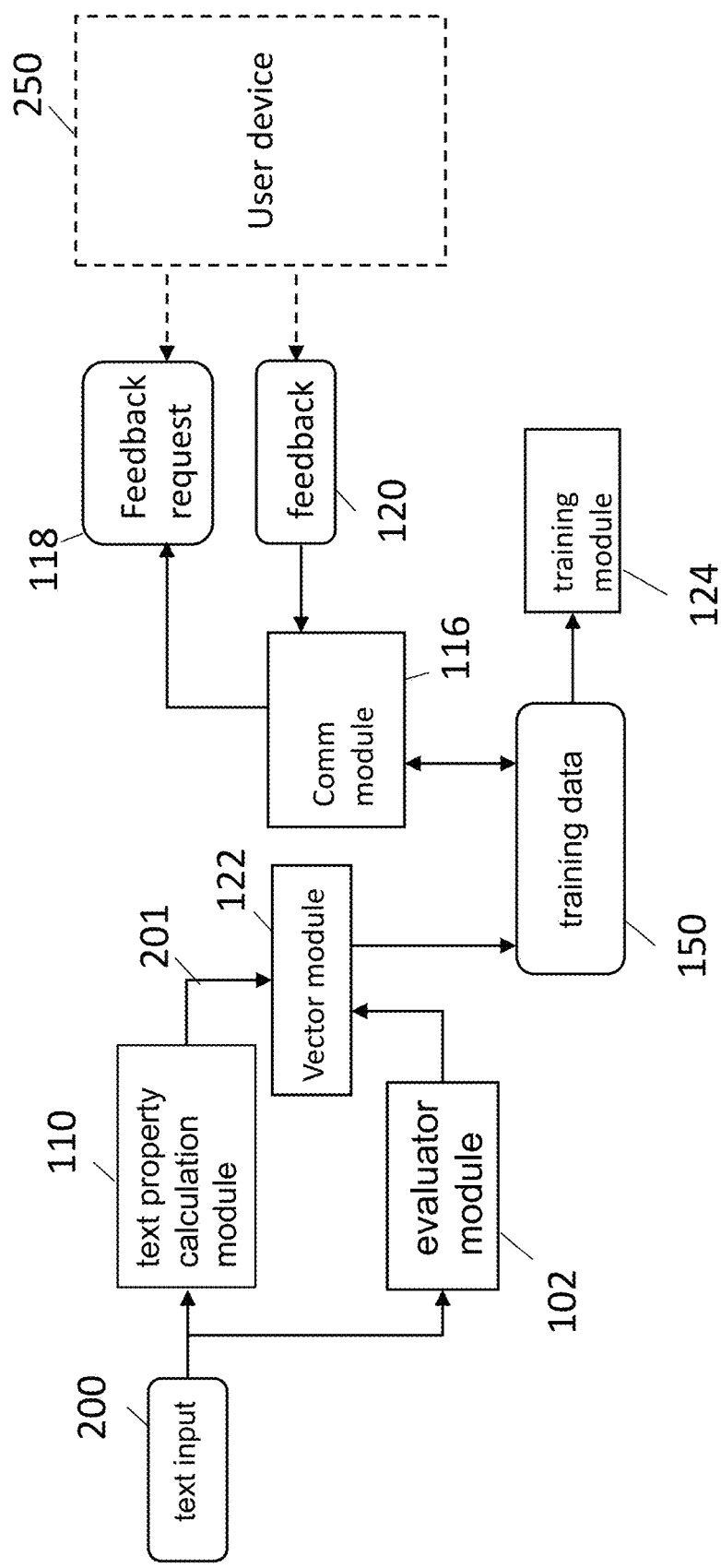
FIG. 3 schematically depicts a classification engine which includes a training module for training the optimisation module, in accordance with an embodiment of the present invention.

FIG. 3 depicts a training and feedback process for the classification engine 100. As previously mentioned, an incoming (received) message, which includes or shows text 200, or is converted into text 200 (e.g. in the form of a recorded voice message), is processed by the property calculation module 110 which calculates a plurality of properties 201 in relation to the text 200. The properties are provided to the vector module 112, and then the optimisation algorithms 122 are applied, for the purpose of identify the best-performing or best suited evaluator based on past data.

The text 200 is also provided to the evaluator module 102, where the plurality of evaluators 101 and the authority rules evaluator 108 (if provided) are run to generate outputs 104, 109 in respect of a number of categories. The optimal output from the general evaluators 101, or the output of the authority rules evaluator 108 (if applicable), will be used for determining the classification by the classification engine 100.

The classification engine 100 includes a communication module 116, which may be adapted to provide the classification output from the classification engine 100 in a feedback request 118 to a device 250 of the sender of the message, but in most cases this will be provided to a responsible party associated with the user, such as a parent, a teacher, a coach, a manager, etc, who is authorised to receive the output of the classification engine 100. The feedback request 118 may include the processed message itself so that the authorised person can decide whether the classification output is correct. The communication module 116 is further adapted to receive the feedback data and provide it to other part(s) of the classification engine 100.

The feedback request 118 may be in the form a text message, as an email, as a message within a particular social communication or messaging platform, or in the user interface of a dedicated communication application. The user or responsible party are enabled to provide a feedback 120 as to whether the classification output is accurate. The feedback 120 may be provided via a web or an application interface. In the scenario where feedback is only requested when the classification output is the assignment of one or more categories, the feedback received can indicate whether the assignment was a false positive or a true positive. In the scenario, where the feedback is requested even when the classification output is the decision not to assign one or more categories, the feedback received can indicate whether this decision was a true or false negative. For instance, this may be done, if the best-suited evaluator 101 returns the result that a category should not be assigned because the evaluation score for that category is very close to but does not meet the threshold. Or, this may be done, if a category is not assigned, because although the "best suited" category returns the result that an assignment should be made, the likelihood of success attached to that category is close to but does not meet the success likelihood threshold.

The feedback 120 may further include an input or a selection of the appropriate classification that should have been output by the classification engine 100, if the classification originally provided was inaccurate. For instance, a feedback request may ask a registered user to confirm that the assignment of a particular category (e.g. fear) is correct, and if it is incorrect, input or choose the category (e.g. sadness) that should have been assigned.

The feedback data is used to assess the performance (i.e., accuracy or suitability) of the "best performing" evaluator as previously identified by the algorithms in the classification engine 100. This feedback is used to update the training data 150. As mentioned above, for each message received, data including at least the classification output, the message vector associated with the text to which the output is applied, and the evaluator which produced the classification system output, are stored in the training data. There is further a feedback or confirmation associated with the classification system output. For instance, this will either be a success (true positive) or failure (false positive). As mentioned earlier, the updated data can then be used in the determination of the "best suited" or "best performing" evaluator 101.

As shown in FIG. 3, the classification engine 100, or more specifically, the algorithms 122 in the classification engine 100 which determine the "best suited" evaluator for a given message vector, on the basis of historical data 150, can also be updated. The classification engine 100 may include one or more training algorithms 124 which have access to the training data 150, in order to retrain the optimisation algorithm(s) 122. For instance, the retraining will determine a new set of scaling factors that need to be applied to the raw numbers associated with the properties included in the message vectors. The message vectors associated with the test or past messages which are present in the training data set will thus be updated using the new set of scaling factors. When the classification engine 100 again processes a new message after this process, the processing will now be done on the basis of the retrained optimisation module.

Figure 4:
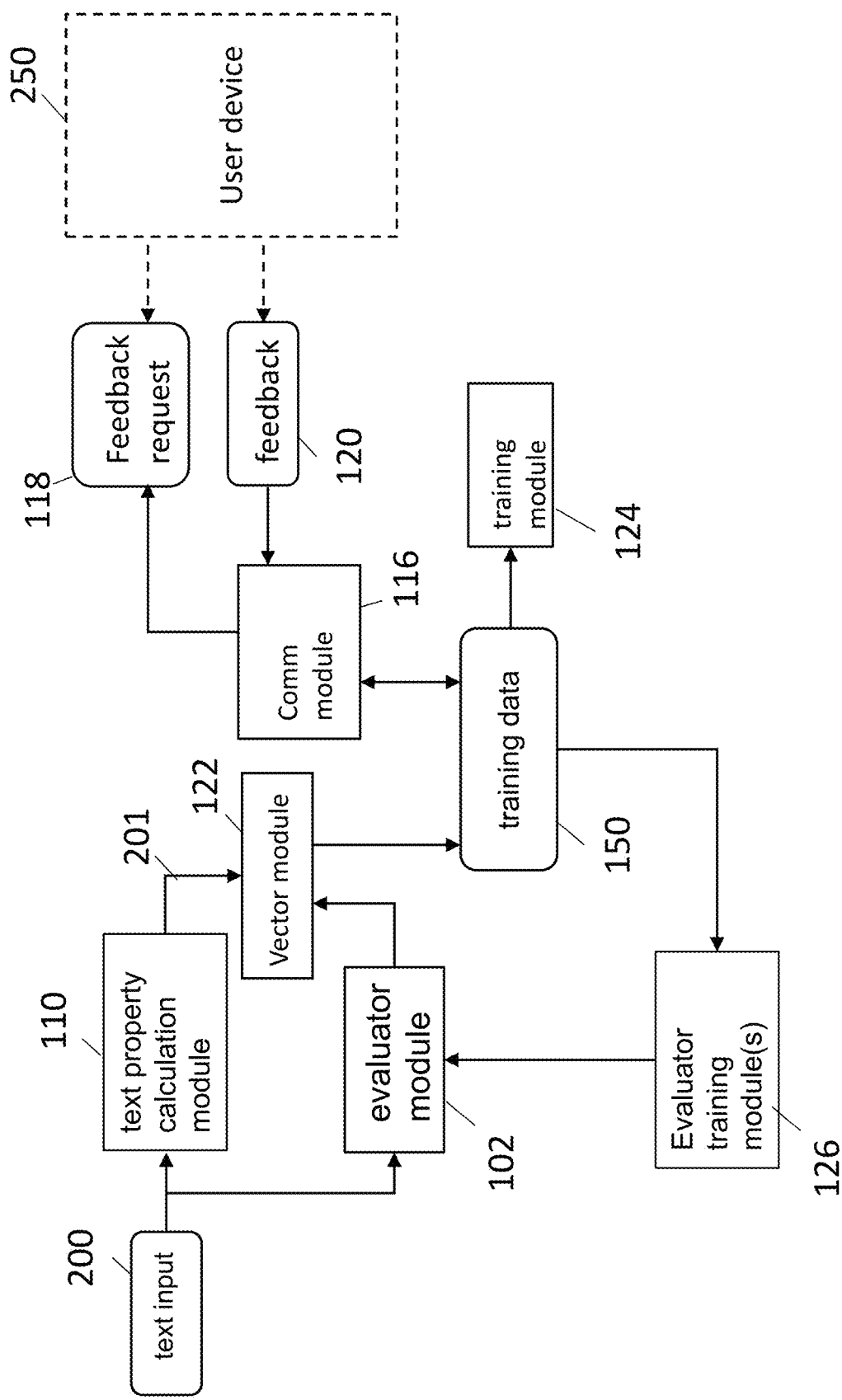
FIG. 4 schematically depicts a classification engine which includes a training module for training the evaluators, in accordance with an embodiment of the present invention.

As shown in FIG. 4, the classification engine 100 can further include one or more evaluator training algorithms 126 to retrain the evaluators 101 on the basis of the training data set. The specific algorithms will depend on the type of the evaluators being retrained. This can be ascertained by the skilled person.

Figure 5:
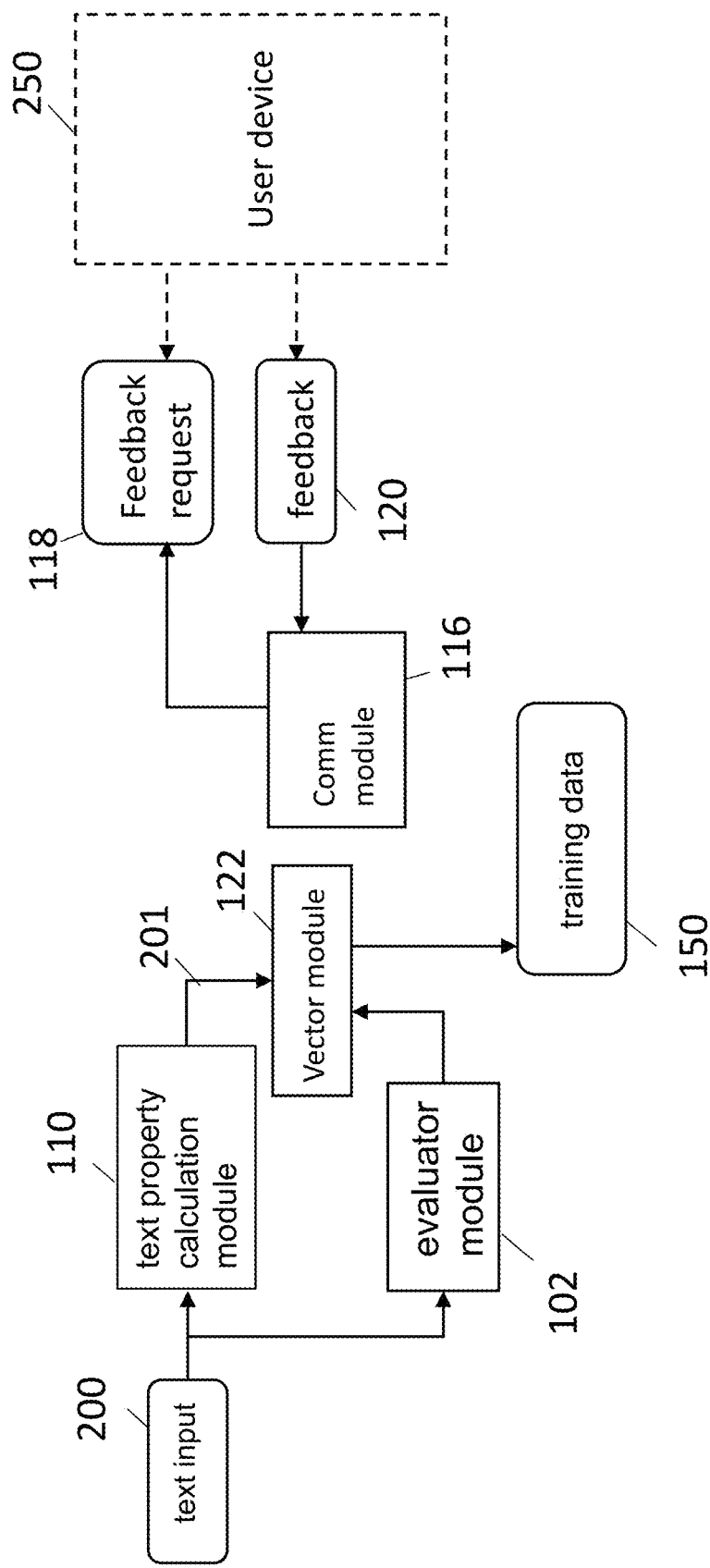
FIG. 5 schematically depicts a training process for training the classification engine, in accordance with an embodiment of the present invention.

Alternatively, the optimisation algorithms(s) are adapted to be self-training and will have access to the training data 150 (see FIG. 5).

In alternative embodiments, the retraining may be done manually. For instance this may be done by examining the success scores (likelihood of success given historical data and feedback), and then reoptimize the parameters in the algorithms to e.g., find the best weighting, coefficient, threshold, etc. This may be done, in some cases, using statistical methods such as regression analysis.

The execution of either of the retraining modules 124, 126 may be triggered by a user feedback indicating an incorrect classification output, or it may occur on a regular basis, or at such times as decided by the system administrator.

As alluded to above, as the classification engine 100 processes more data, it is trained to learn which evaluator(s) 101 are best suited for particular categories or domains of categories, given a particular message "vector". In particular, the optimisation module 106 learns how to choose the best suited evaluator for particular categories, or domains of categories.

In the above-mentioned embodiments, the algorithms in the classification engine 100 may have different specific implementations at the discretion of the skilled person.

The optimisation module 106 may be initialised differently in different embodiments. For instance, it may be initialised on the basis of a particular set of base assumptions. Or it can be initialised by training the classification engine 100 on the basis of a set of test data where the message texts are known, and the success of failure of each of the evaluator algorithms included in the evaluator module 102 in evaluating the assignment of different categories to these message texts is known. Weightings for evaluators can be pre-populated with results from test data during training and historic text items with specific user intervention.

The various modules or algorithms which together provide the functionalities of the classification engine 100 may be provided by one processing unit or across different processing units.

The user feedback may be enabled by a web interface, or an application interface accessible by the user or the associated responsible party. The associated responsible parties may themselves be registered users.

The classification engine 100 may be provided as a full stack solution along with a messaging or communication system which users can access. The users can, but are not required to be, registered users. In some cases, the messaging or communication system can be purpose built for a specific group of users—for instance, the students at a particular school, members at a sports club or team, a particular corporate or government group.

Figure 6:
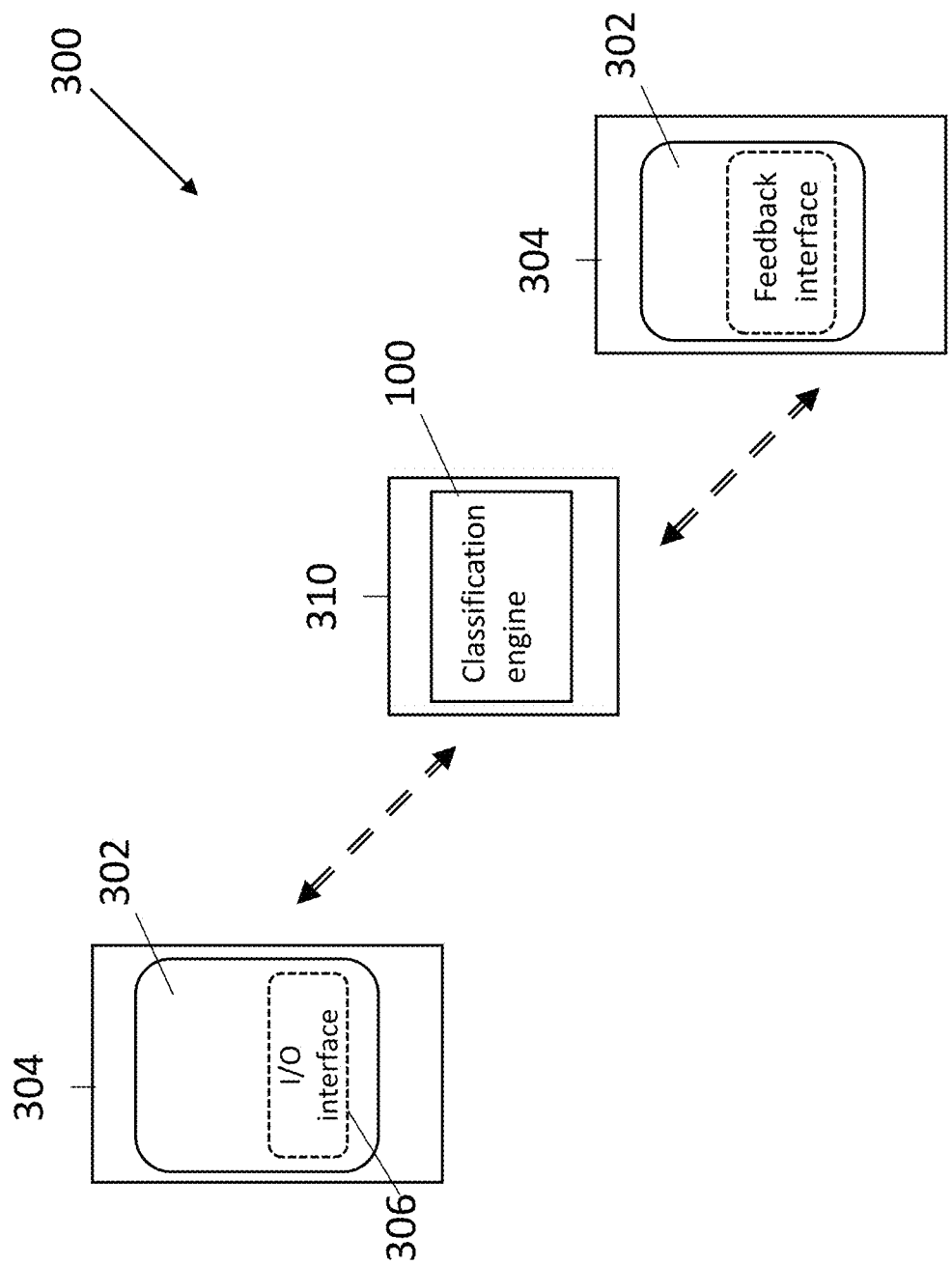
FIG. 6 schematically depicts a communication platform in accordance with an embodiment of the present invention.

As shown in FIG. 6, the messaging or communication system can be provided as a platform 300 accessible on the internet or over a private communication network (such as a virtual private network). For instance, the platform 300 includes instances of user interfaces that can be provided by a messaging or communication application 302, which can each be run on a computer or a mobile device 304 associated with a user. For instance, the messaging or communication platform will provide an interface 306 for users to compose and send messages, using e.g., a touch screen or keyboard input. The platform 300 includes a server (may be one or more server computers) 310 which comprises the classification engine 100 to receive and process the messages, and to provide the feedback request to and receive feedback data from the sender of the message or another user. The messaging or communication platform may also provide an interface 308 for a user (the message sender or another user) to receive the feedback request and reply to the feedback request. The user interface portions of the platform are accessible over the internet or a private network, from a computing device associated or accessible by the user.

Alternatively, the classification engine 100 can be used with a third-party messaging or communication system, from which the message data are supplied, provided appropriate consents are obtained. For instance, it may be provided as a program application which can be installed by authorised users, being users who have the authority to receive or review the classification outputs of messages sent by others. The program application, in some cases, are mobile applications which can be installed and run on mobile devices. In some embodiments, the program application may cause a notification to be initiated on the device of an authorised user, e.g., in the form of an alert message, when the classification engine determines an urgent event—such a positive classification of "danger", "self-harm", "violence", etc. The notification may provide a contact detail or a suggested action to be taken, particularly in cases of potential emergency. The notification may also provide suggestions as to how the authorised user may wish to address the situations (e.g., depression, sadness) identified by the classification engine. The authorised user may further be enabled to provide a feedback, within the alert, to confirm whether the classification is correct.

The input message which is processed is a text input. However, the text input may in some cases be provided by the user as a spoken text or audio data, and then converted into text for processing.

Within this invention, different embodiments of the classification engine may process the input messages for different collections of categories. For instance, classification engines which autonomously monitor messages in a professional setting may monitor only for categories indicative of violence, self-harm, dissatisfaction, and not for categories that may be of a more personal nature. Classification engines are provided for parents to receive notifications regarding messages by their children may further process the messages for, e.g., sadness, etc.

Other variations and modifications may be made to the parts previously described without departing from the spirit or ambit of the disclosure. Various features from the different embodiments as mentioned above may be combined.

In the above and in the following claims, the word "module" is used to functionally refer to those part or parts of the classification engine which provide the specific function of the module. It does not place a requirement on a physical arrangement of the memory locations of the algorithms which functionally belong to the same "module".

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of classifying a received message comprising a text, to determine whether to assign one or more classification categories to the message, comprising:
   evaluating the received message using two or more general evaluators, including at least a first general evaluator and a second general evaluator different from the first general evaluator, each of the first and second general evaluators being applicable for evaluating texts for multiple categories, wherein the first and second general evaluators are trained to focus on different contexts of a message;
   whereby each of the two or more general evaluators analyses the received message to determine values of one or more properties of the received message, for each classification category that the general evaluator is evaluating, to determine an output representing a probability that the received message should be assigned with that classification category, wherein the output is dependent on the values of the one or more properties of the received message;
   determining a classification output based on outputs of the first and second general evaluators, including applying weightings to the outputs of the at least first and second general evaluators and combining the weighted outputs of the at least first and second general evaluators.

2. The method of claim 1, further comprising evaluating the message using at least one authority evaluator, the at least one authority evaluator being adapted to match the text against a criterion or multiple criteria, specific to one of the classification categories.

3. The method of claim 2, wherein a positive determination of assignment by the at least one authority evaluator to the corresponding classification category overrides a negative determination by the first or second general evaluators in relation to the same classification category.

4. The method of claim 2, wherein a negative determination of assignment by the at least one authority evaluator to the corresponding classification category overrides a positive determination by any one of the general evaluators in relation to the same classification category.

5. The method of claim 1, including the step of optimising the outputs of the general evaluators, by selecting one of the outputs of the general evaluators or by combining the outputs of two of more of the general evaluators.

6. The method of claim 1, wherein the properties of the message include statistical properties of the text, the language in which the text is written, one or more non-content related properties, or one or more entities identified in the text, or a combination thereof.

7. The method of claim 5, including, for each classification category, determining a best suited general evaluator on the basis of the values of the properties.

8. The method of claim 7, including, for each category, identifying from a set of past messages, at least one past message having similar values for the properties as the text, and identify a best performing general evaluator in relation to the at least one identified one past messages, wherein the best suited general evaluator is the identified best performing general evaluator.

9. The method of claim 8, including converting the values of the properties of the message into a message vector.

10. The method of claim 9, wherein the non-numerical values of the properties of the message are converted into numbers, so that the message vector is a numerical vector.

11. The method of claim 10, wherein scaling factors are applied to numbers in the numerical vector.

12. The method of claim 9, wherein a distance between message vectors are used to determine how similar messages from which the message vectors are obtained are to each other.

13. The method of claim 12, wherein identifying the at least one past message includes identifying past messages that are within a predetermined distance from the message vector corresponding to the received message.

14. The method of claim 9, including dividing the past messages into two or more different groups on the basis of their corresponding message vectors, and identifying the group to which the message vector corresponding to the received message belongs.

15. The method of claim 1, including enabling a user to provide feedback regarding an accuracy or indicating a success or failure of the classification output.

16. A non-transitory machine-readable medium including thereon computer code executable to implement the method of claim 1.

17. A system for classifying a received message comprising a text, to determine whether to assign one or more classification categories to the message, comprising a communication device for data communication with one or more user device, a server configured to execute machine-readable instructions to:
   evaluate the received message using two or more general evaluators including at least a first general evaluators and a second general evaluator different from the first general evaluator, each of general evaluator being applicable for evaluating texts for multiple classification categories, the first and the second general evaluators being trained to focus on different contexts of a message;
   wherein said evaluation of the received message involves, using each of the first and second general evaluator to: analyse the received message to determine values of one or more properties of the received message, for each classification category that the general evaluator is evaluating, to determine an output representing a probability that the received message should be assigned with that classification category, wherein the output is dependent on the values of the one or more properties of the received message; and determine a classification output based on outputs of the at least first and second general evaluators, including applying weightings to the outputs of the at least first and second general evaluators and combining the weighted outputs of the at least first and second general evaluators.

18. The system of claim 17, wherein said algorithms comprises one or more optimisation algorithms for optimising the outputs of the general evaluators on the basis of more properties, wherein the one or more optimisation algorithms are self-training.

19. The system of claim 17, wherein the program modules reside on one processing unit, or across two or more processing units.

\* \* \* \* \*